March 26, 1963    L. C. RADWAY    3,082,785
AUTOMATIC SHUT-OFF VALVE

Filed April 18, 1960    2 Sheets-Sheet 2

INVENTOR.
LAWRIE C. RADWAY
BY
ATTORNEY

United States Patent Office 3,082,785
Patented Mar. 26, 1963

3,082,785
AUTOMATIC SHUT-OFF VALVE
Lawrie C. Radway, Milwaukee, Wis., assignor to Milwaukee Valve Company, Inc., Milwaukee, Wis., a corporation of Wisconsin
Filed Apr. 18, 1960, Ser. No. 22,740
6 Claims. (Cl. 137—386)

This invention relates to nozzles which automatically shut off when the level within the container reaches a predetermined level.

Nozzles of this general type are not new and in fact are widely used. This nozzle has been designed to meet a military requirement not heretofore met by general nozzles available. In landing operations for the military, large collapsible storage tanks are filled automatically on a ship-to-shore arrangement. It is not feasible under such circumstances to have an operator in attendance during the complete filling operation. An automatic shut-off nozzle is required which is locked in the open position and can be closed by manual or automatic means to provide positive shut down. Automatic shut-off type fuel nozzles generally have complicated shut-off mechanisms which respond to the presence of fuel at the nozzle outlet and are subject to failure under rough handling and are not readily serviceable in the field.

The primary object of the invention is, therefore, to provide a nozzle which is simple in construction so that it can be readily serviced in the field and is completely reliable in operation.

In this type of storage tank the inlet to the fuel container may be located at any height with respect to the level of fuel in the tank causing a back pressure to exist at the nozzle after shut down. Fuel nozzles of this type are generally spring biased to a closed position and there is no provision for back pressure since the nozzle is located in the inlet and shuts off when the fuel level rises into the inlet. Where the inlet is located at a level below that of the fuel, the back pressure may overcome the bias of the spring allowing the fuel to leak out of the tank through the nozzle.

A further object of this invention is to provide a fuel nozzle which is positively closed when the fuel tank is full.

These objects are accomplished by having a venturi section located in the outlet of the nozzle with the venturi being connected to a pressure chamber. A diaphragm forms one wall of the chamber and is connected to a holding device for a spring biased shut-off valve so that the valve will be released whenever a pressure reduction in the chamber moves the diaphragm. Since a low pressure will always exist at the venturi whenever the fuel is flowing through the nozzle, an air bleed line is connected to the chamber from the top of the supply tank so that the pressure in the chamber only varies when the air bleed line is cut off by fuel closing the end of the air bleed line. With this arrangement the nozzle may be located anywhere in the tank, but is shut off only when the tank is filled to a level determined by the location of the air bleed line.

Other objects and advantages will be pointed out in, or be apparent from, the specification and claims, as will obvious modifications of the two embodiments shown in the drawings, in which:

FIG. 3 is a side elevation of a modified type of fuel nozzle showing a manually actuated latch means.

Figure 1:
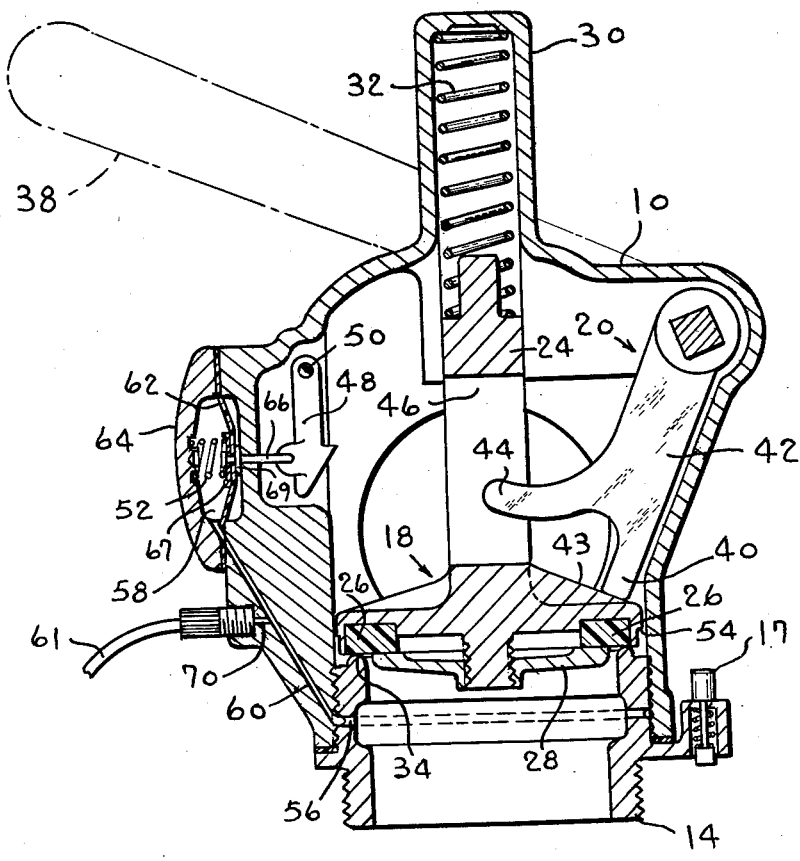
FIG. 1 is a side elevation in section of the fuel nozzle with the valve in the closed position.

As seen in the drawings, the fuel nozzle has a body 10 having an inlet which is connected to the hose leading from the fuel pump and an outlet 14 threaded for connection to a fuel tank 16. The outlet is provided with locking member 17 to secure the nozzle to the inlet to the tank after assembly. Fuel flowing through the nozzle is regulated by valve 18 which is actuated by lever assembly 20.

The valve includes resilient seal 26 held thereon by plate 28 threaded on the face of the valve. The valve is biased by spring 32 acting on stem 24 in guide sleeve 30 against seat 34 to prevent the flow of fuel. It should be obvious that the valve assembly moves in the direction of fuel flow so that the seal is forced tightly against the seat by the pressure of the fuel in the line. With the valve in the closed position, finger 40 on valve actuator 42 operatively engages rib 43 on the back of the valve, positively holding the valve closed.

The valve is opened by rotating handle 38 clockwise (FIG. 1) so that finger 40 on the valve actuator rotates clear of rib 43. Finger 44 also on the valve actuator will rotate upward in slot 46 in the valve stem until it bears against the upper end of the slot and thereafter moves the valve away from flange 34 and compresses spring 32. The handle is rotated until latch 48, pivoted on pin 50, can engage flange 54 provided on the periphery of the valve. When the latch engages the flange on the valve, the valve will be locked in the open position (FIG. 2) so that fuel may flow therethrough.

The latch is biased toward the valve by spring 52 acting against spring pad 67 on the end of rod 66 which is connected to the latch. Diaphragm 62 is mounted on rod 66 and is sealed to the spring pad by diaphragm pad 69. The diaphragm is secured to the body by cover 64 which forms chamber 58 next to the diaphragm. A venturi section 56 is provided in the outlet 14 and is connected to chamber 58 by passage 60. The pressure in the chamber will be reduced whenever fuel flows past the venturi causing the diaphragm to move away from the valve. By providing a dip tube 61 in the air outlet of the supply tank and connecting the tube to the venturi through passages 70 and 60, there will be no pressure change in the chamber until the air passage is blocked by fuel rising in the air outlet of the tank to cut off the air and permit the venturi to draw a vacuum. With this arrangement, the pressure drop across the venturi is not transmitted to the diaphragm until the fuel level in the tank reaches the end of the dip tube. The tank may be filled to any predetermined level by merely changing the location of the dip tube.

In operation of the valve is secured to the inlet of a supply tank and locked in place by locking member 17. Handle 38 is rotated clockwise (FIG. 2) to move valve 18 upward against the bias of spring 32 until latch 48 engages flange 54 on the valve. Fuel will flow through the nozzle creating a low pressure area across venturi 56. Air will flow from the outlet of the supply tank through passages 70 and 60 into the venturi so that there will be no pressure drop in chamber 58. As soon as the fuel level in the tank reaches the end of passage 61, the air supply will be cut off reducing the pressure in chamber 58. Diaphragm 62 will move away from the valve, releasing the latch from the valve. The valve will move toward the outlet due to the bias of spring 32. As the valve moves into the path of flow of the fuel, the pressure of the fuel behind the valve will aid spring 32 in seating the valve on seat 34, forming a fluid-tight seal in the outlet. The movement of the valve in the closing direction will impart a rotary force to valve actuator 42 and handle 38. The handle will continue to rotate until finger 40 locks the valve closed. This will prevent the valve from reopening due to the back pressure of the fuel in the inlet acting against the valve.

With this arrangement, a single fuel passage is used for high volume fuel flow with none of the working parts exposed. The latch operates solely on the valve and it is the latch which is tripped by the aspirator. The nozzle is therefore relatively simple and compact in structure and requires very little maintenance.

Figure 2:
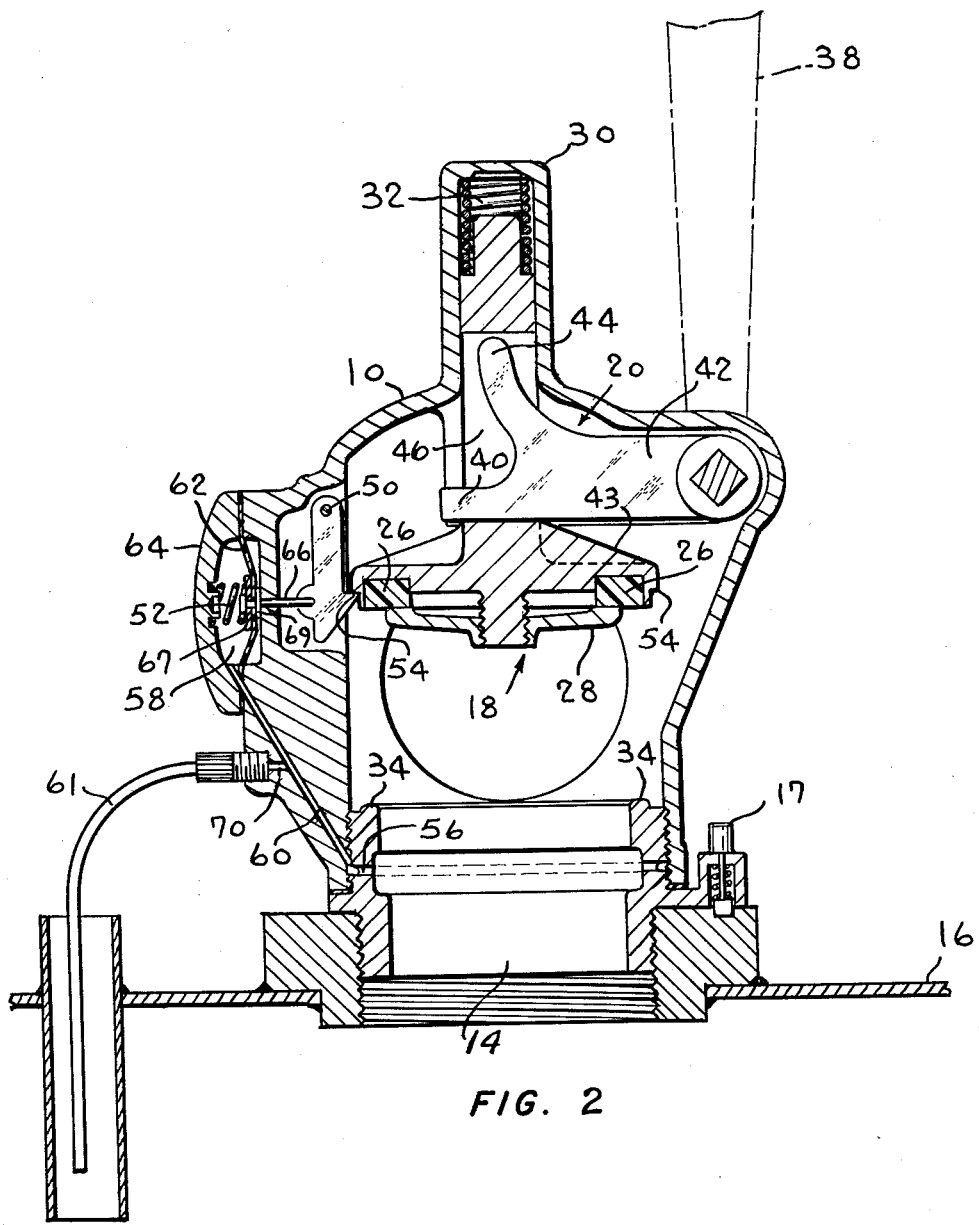
FIG. 2 is a side elevation in section with the valve locked in the open position.

In a second version shown in FIG. 3, pressure control is eliminated and a manual trip mechanism 80 is shown which can be used to replace the automatic diaphragm type mechanism shown in FIG. 1. In this device, button 82 is connected to latch 48 and rod 66 by means of extension 84. An O-ring seal 85 is provided on the extension to prevent the leakage of fuel from the nozzle. The latch is biased toward the valve by spring 86 acting on spring plate 88 which is secured to extension 84. The modified nozzle is opened as previously described by rotating the handle until the latch engages flange 54 holding the valve open. When the fuel container is filled to the predetermined level, the operator merely pulls the button to trip the latch allowing the valve to close.

Although but two embodiments of the present invention have been illustrated and described, it will be apparent to those skilled in the art that various changes and modifications may be made therein without departing from the spirit of the invention or from the scope of the appended claims.

I claim:

1. A nozzle having an inlet and an outlet, a valve controlling flow from the inlet to the outlet, means for biasing the valve closed, means for opening the valve said valve opening means including means for locking the valve closed, latch means for retaining the valve in an open position against the force of the biasing means, and aspirator means connected to the latch to move the latch to a position to allow the valve to close, said valve engaging said opening means in its return motion to positively set the means for locking the valve closed, said aspirator being vented to an outlet remote from the nozzle and positioned to be blocked by the level of liquid in the container to prevent further aspiration.

2. A nozzle according to claim 1 wherein the aspirator means includes a venturi in the outlet through which the entire flow passes.

3. A nozzle for filling a liquid container comprising a body having an inlet and an outlet, a valve regulating flow between the inlet and the outlet, spring means biasing the valve closed, a diaphragm movable between a normal position and an operative position, a stem connected to the valve for actuating the valve, a handle pivoted on the body for manual actuation, a latch pivoted on the body and operatively connected to the diaphragm, a valve actuator connected to pivot with the handle and operatively engaging the stem to normaly lock the valve closed and to open the valve when the handle is actuated, said latch holding the valve in an open position when the diaphragm is in the operative position, and means for moving the diaphragm to the normal position to release the latch from the valve so that it moves to a closed position, said handle being rotated by the closing motion of the valve to set the valve actuator in the lock position with respect to the valve.

4. A nozzle according to claim 3 wherein the moving means includes a venturi in the outlet operatively connected to the diaphragm and means remote from the nozzle outlet responsive to the level of the liquid in the container for rendering the venturi inoperative until the container is full whereupon the venturi will cause the diaphragm to move and release the latch from the valve.

5. A nozzle for filling a liquid container comprising a body having an inlet and an outlet, valve means biased to a closed position for controlling flow through the nozzle, means for opening the valve means, said opening means including means for locking the valve closed, means for holding the valve open, means for releasing the holding means when the container is full so that the valve means returns to the closed position, and said opening means responding to the motion of the valve means to lock the valve means in the closed position when the holding means is released.

6. A nozzle for filling a liquid container comprising, a body having an inlet and an outlet, valve means movable to an open position and biased to a closed position for controlling flow through the nozzle, means for opening the valve means, means for holding the valve open, said holding means including a flange on the valve means and a latch positioned to operatively engage the flange when the valve means is moved to the open position, means for releasing the holding means when the container is full so that the valve means returns to the closed position, said releasing means including a venturi in the outlet and a diaphragm connected to the latch, said venturi being operatively connected to the diaphragm so the diaphragm is responsive to the pressure drop across the venturi due to the flow of liquid through the outlet, means remote from the outlet to relieve the pressure on the diaphragm caused by the flow of liquid through the outlet, said remote means being connected to indicate the level of liquid in the container so the venturi releases the diaphragm when the level is reached, and said opening means responding to the motion of the valve means to lock the valve means in the closed position when the holding means is released.

References Cited in the file of this patent

UNITED STATES PATENTS

| | | |
|---|---|---|
| 1,084,425 | Hager | Jan. 13, 1914 |
| 1,550,738 | Payne | Aug. 25, 1925 |
| 1,713,402 | Shivers | May 14, 1929 |
| 2,528,697 | Logan et al. | Nov. 7, 1950 |
| 2,646,817 | Cox | July 28, 1953 |

FOREIGN PATENTS

| | | |
|---|---|---|
| 498,076 | Belgium | Sept. 30, 1950 |